Nov. 20, 1928.
J. P. BETHKE
1,692,613
MAGNETIC PULLEY FOR PAN CONVEYERS
Filed Feb. 20, 1925 3 Sheets-Sheet 1
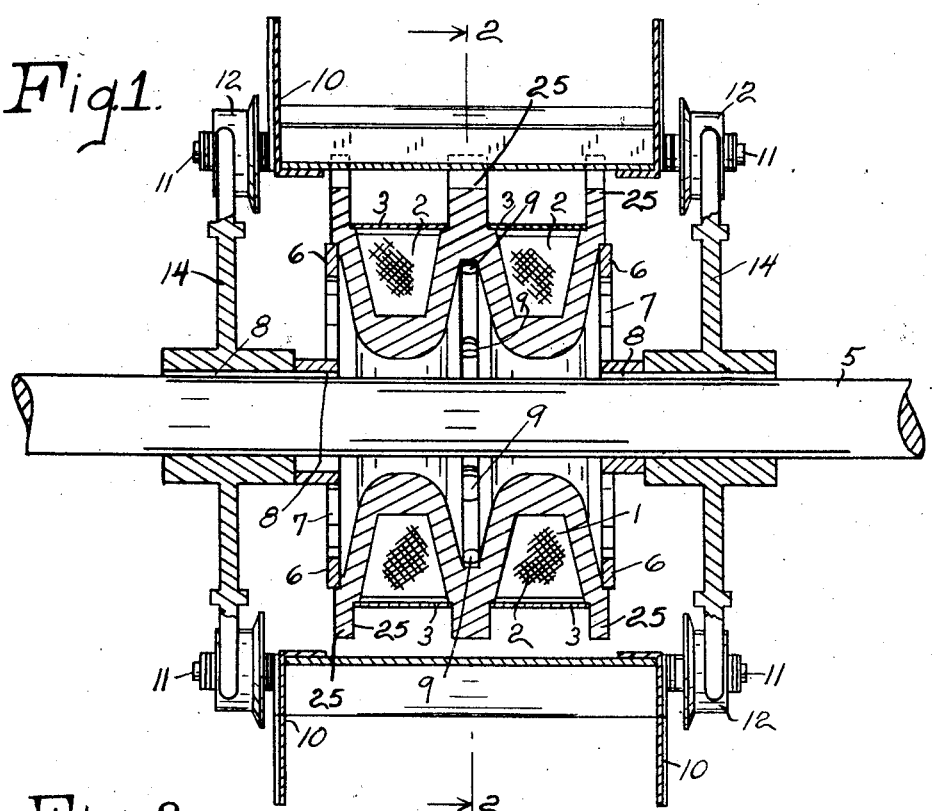
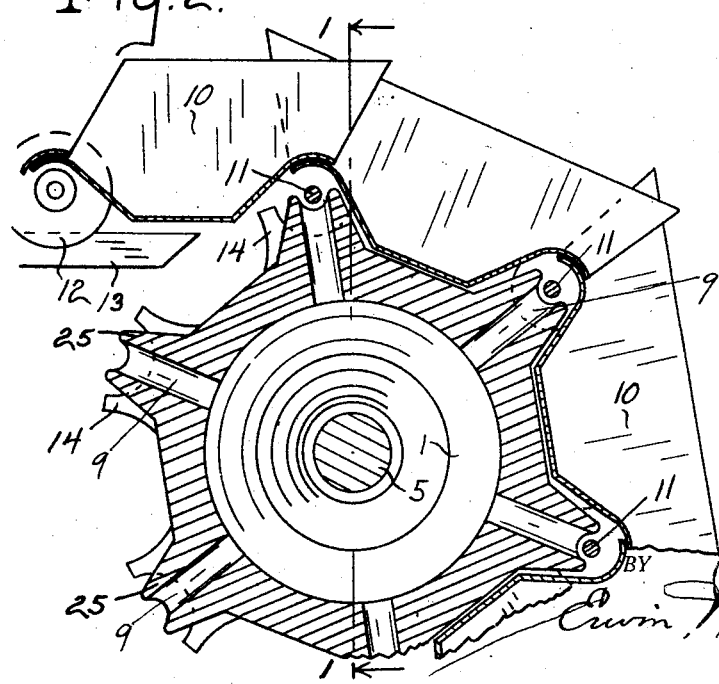
INVENTOR.
John P. Bethke
BY
ATTORNEYS.

Nov. 20, 1928.  
J. P. BETHKE  
1,692,613  
MAGNETIC PULLEY FOR PAN CONVEYERS  
Filed Feb. 20, 1925    3 Sheets-Sheet 2

INVENTOR.  
John P. Bethke  
BY  
Erwin, Wheeler & Woolard  
ATTORNEYS.

Nov. 20, 1928.

J. P. BETHKE 1,692,613

MAGNETIC PULLEY FOR PAN CONVEYERS

Filed Feb. 20, 1925    3 Sheets-Sheet 3

INVENTOR.
John P. Bethke
BY
Erwin Wheeler Woolard
ATTORNEYS

Patented Nov. 20, 1928.

1,692,613

UNITED STATES PATENT OFFICE.

JOHN P. BETHKE, OF MILWAUKEE, WISCONSIN, ASSIGNOR TO MAGNETIC SEPARATOR COMPANY, OF MILWAUKEE, WISCONSIN, A CORPORATION OF WISCONSIN.

MAGNETIC PULLEY FOR PAN CONVEYERS.

Application filed February 20, 1925. Serial No. 10,700.

This invention relates to improvements in magnetic pulleys for pan conveyers.

Pan conveyers, of the type for which the magnetic pulleys herein disclosed are constructed, comprise a series of pan-shaped metal sections pivotally joined to form an endless conveyer belt. Magnetic pulleys provided with axially spaced magnetic poles have heretofore been constructed in cylindrical form, and as the pans therefor constructed have flat bottoms, they have only line contacts with the pulleys over which they pass, the greater portion being in relatively widely spaced relation to the pulley. On each side of this line, the air gap progressively widens with a corresponding weakening of the magnetic flux.

Therefore, it is the principal object of this invention to provide a pulley having axially spaced poles so constructed that all portions of the pan bottoms in registry with the poles of the pulley come into close proximity or approximate contact with such poles as the pans pass over the magnetic pulley, thereby obtaining a higher efficiency of the magnetic flux and distributing it more evenly throughout the bottoms of the conveyer pans.

Another object of this invention is to provide for pan conveyers a magnetic pulley having magnetic poles so shaped that all portions of the pans adjacent the poles will come into close proximity to the poles, the poles of the pulley comprising gear or sprocket wheels having teeth engageable with the fulcrum pins, or rollers thereon, connecting adjacent pans, thus adapting the magnetic pulley for use as power transmitting means to drive the conveyer belt.

A further object is to provide for a pan conveyer comprising a series of pans each pivotally connected to adjacent pans and having a magnetic pulley, sprocket wheels coaxial with the pulley and engageable with rollers carried beneath the conveyer, and supporting rails for the conveyer extending to the sides of the pulley and engageable with conveyer rollers laterally of the conveyer, the rails being adapted to support the conveyer pans until the sprocket wheels assume the load and to strip the pans from the influence of the magnetic pulley when the sprocket wheels should normally be relieved of their load.

In the drawings:

Fig. 1 is a longitudinal sectional view of one form of pulley taken on line 1—1 of Fig. 2.

Fig. 2 is a sectional end view taken on line 2—2 of Fig. 1.

Like parts are identified by the same reference characters throughout the several views.

Figure 3:
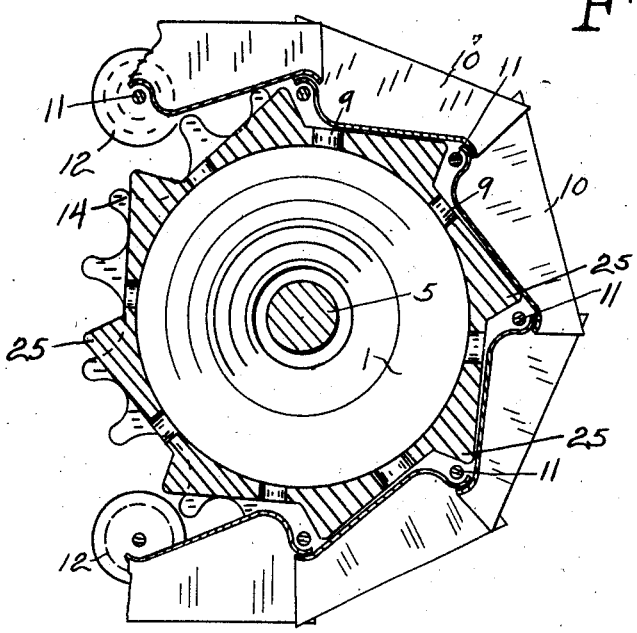
Fig. 3 is a sectional end view of a modified form of pulley.
Figure 4:
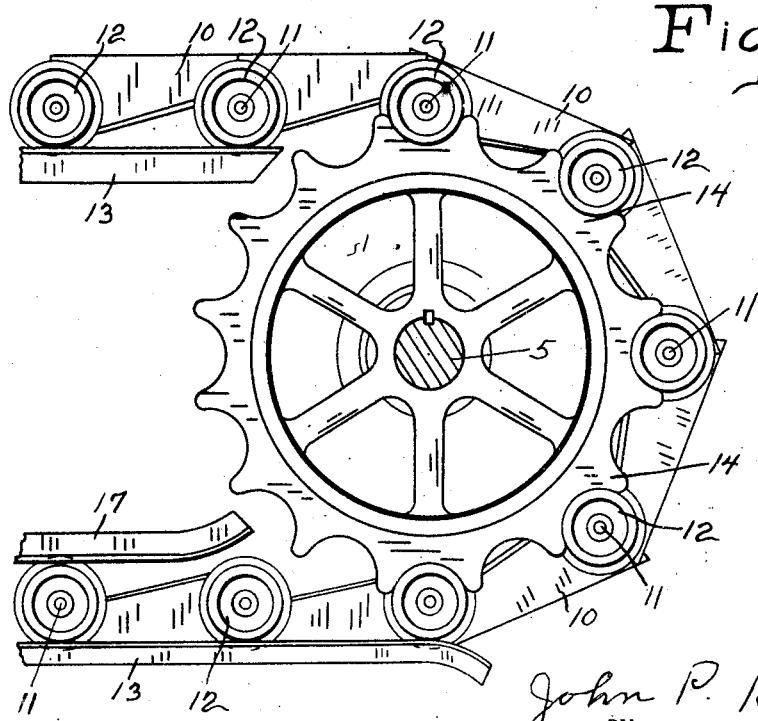
Fig. 4 is an end elevation of the device shown in Fig. 3.

The magnetic pulleys herein described each comprise a pair of hollow spool-shaped, magnetic cores 1 which are integrally joined and provided with exciting windings 2 disposed within the annular bands 3. The pulleys are each supported from a shaft 5 by rings 6 provided with ventilating apertures 7 and keyed to the shafts at 8. Vent holes 9 are provided in the peripheries of the pulleys.

Passing about each of the pulleys is a conveyer comprising a series of pans 10 each pivotally joined to adjacent pans by pins 11 extending across the conveyer and provided with flanged wheels 12 for supporting the pan conveyers from tracks 13. As shown in Figs. 1 to 5, inclusive, the wheels 12 support the pans from the sprocket wheel 14 with which they mesh as the pans pass about the magnetic pulleys. These sprocket wheels are secured to shafts 5 and revolve with the magnetic pulleys as a unit. Rail 17 above the lower rail or track 13 is disposed in the path of the rollers 12 about the axis of the sprocket wheels 14 and is provided for pulling the pans from the influence of the magnetic pulleys.

In order to distribute the magnetic flux uniformly throughout the pans 10 as they pass about the pulleys, the magnetic poles of the pulleys are extended beyond the peripheries of the protecting bands 3 and so shaped that full lengths of the bottoms of the pans adjacent the poles are closely positioned to the extended poles, thus distributing the magnetic flux evenly over the bottoms of such pans. The several forms of extended poles 25 indicated in the various views show several ways of shaping the poles to adapt them for the types of pan conveyer in use. It is, of course, understood that this invention is not limited to the forms of magnetic pulleys shown, but that such forms are illustrative of the broad principle of adaptation of the pulley magnets to bring them into close proximity to the conveyer pans throughout the lengths of the pans.

In Figs. 1 to 4, inclusive, the sprocket wheels 14 are positioned upon the shafts laterally exteriorly of the sides of the conveyer pans and engage the rollers 12 for supporting the pans as they pass about the magnetic pulleys.

Figure 5:
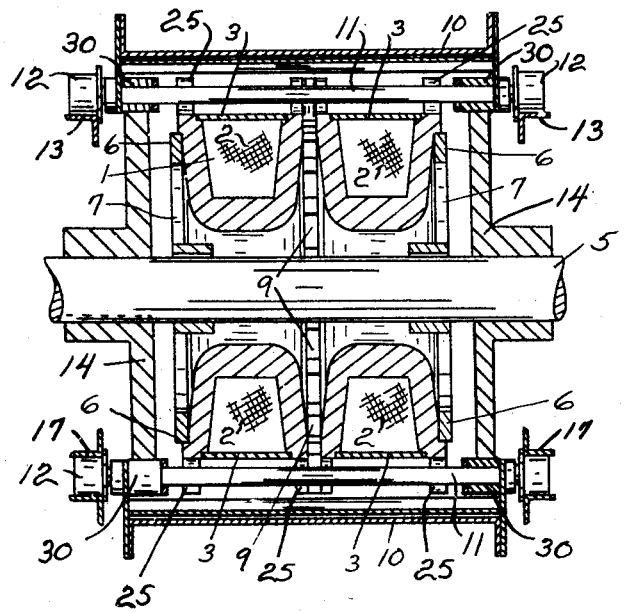
Fig. 5 is a longitudinal, sectional view of a further modified form of pulley.

In Fig. 5 the sprocket wheels are secured to the shaft 5 and positioned beneath the pans laterally within the side margins of the conveyer. In the structure shown in Fig. 5, the sprocket wheels engage the rollers 30 upon the fulcrum pins 11 and support the pans as they pass about the magnetic pulley. This arrangement permits the rails or tracks 13 to be extended to the sides of the magnetic pulley and to support the pans until the rollers 30 come into full mesh with the sprocket wheels.

The advantage of this arrangement over that shown in Figs. 1 to 4, inclusive, is that in the latter figures the upper rail 13 and lower rail 17 cannot be extended beyond the pitch circle of the sprocket wheels. In other words, the rails must be terminated adjacent the pitch circle of the sprocket wheels or the tops of the teeth thereof, the rails and sprocket wheels being disposed in substantially the same plane. In other words, the terminating of the rails adjacent the pitch circle of the sprocket wheels as shown in Figs. 1 to 4, inclusive, permits the magnets of the pulleys to draw the pans downwardly when such pans have left the upper rail 13 and before the rollers 12 have come into full mesh with such sprocket wheels. Similarly the pans are drawn about the magnetic pulleys as they are leaving such pulleys and consequently when they are drawn from the influence of the pulleys by the lower rail 17, the pans cause a great amount of noise. In Fig. 5 the pans are not permitted to drop as they leave the upper rail 13 but are supported by the sprocket wheels. Likewise the structure shown in Fig. 5 prevents the pans from circling about the magnetic pulleys as they are drawn from the influence thereof. That is, when the rollers leave the upper track 13 the sprocket wheels assume the burden and as the sprocket wheels are relieved of the burden of the pans, the lower rail 17 assumes the burden.

Figure 6:
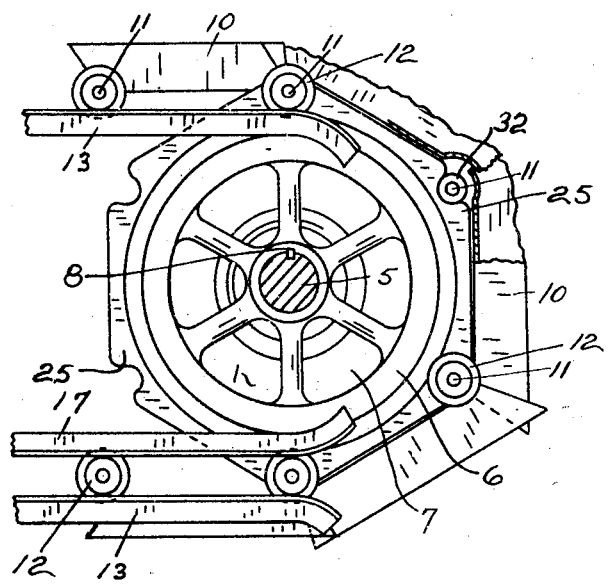
Fig. 6 is an end elevation with a portion broken away to show the pole pieces utilized as sprocket wheels for driving the conveyer.

In Fig. 6 the sprocket wheels 14 have been dispensed with and the extended portion 25 of the magnetic poles are utilized as sprocket wheels and engage rollers 32 upon the fulcrum pins 11. In this form the rails 13 and 17 may be extended to the sides of the magnetic pulley to support the pans until the extended portions 25 of the magnets come into full engagement with the rollers 32 upon the fulcrum pins.

A comparison of the arrangement disclosed in Figs. 1 to 4, inclusive, and those disclosed in Figs. 5 and 6 shows that, if a comparatively quiet running magnetizable conveyer is desired, a magnetic pulley having sprocket pole pieces or separate sprocket wheels positioned directly beneath the conveyer may be utilized to permit extending the conveyer supporting rails to the sides of the pulley for support of the conveyer pans until the sprocket wheels assume the load or receive the load when the sprocket wheels are to be relieved of such load.

It is also evident that from the drawings and foregoing description that a magnetic pulley for pan conveyers has been provided with magnetic poles so shaped that substantially the full lengths of the bottoms of the pans are brought into close proximity to the poles, during their travel about the pulleys. The magnetic flux therefore is distributed evenly throughout the bottoms of the pans and the efficiency of the device materially increased.

While I have shown pans and pole pieces with flat opposing or registering areas it is obvious that the specific contours are not essential. The object is accomplished by having the contours of these surfaces complementary, so that substantial contact or close parallelism is possible.

In this description and the appended claims the term "length", as applied to the pans, has reference to their dimension longitudinal of the conveyer, although in some of these pan conveyers the transverse dimension of any given pan is greater than the distance between the connected margins.

From the foregoing description it is apparent that magnetic material carried by the conveyer will pass about a pulley constructed as disclosed and be attracted to the conveyer pans with great force due to the concentration of the magnetic flux uniformly in the pan bottoms, and thus ensuring to a greater degree the separation of magnetic from non-magnetic material.

I claim:

1. In a magnetic pan conveyer, the combination with an apron composed of interconnected pans, of a magnetic pulley having pole pieces provided with surfaces corresponding substantially in contour and area with the registering surfaces of the pans passing thereover.

2. In a magnetic pan conveyer, a magnetic pulley having a pole piece, the outer surface of which is of a generally polygonal form.

3. A magnetic pulley for pan conveyers and including a spool-shaped magnetic core and an exciting winding on said core, said core having its poles extended radially beyond the periphery of said winding, and substantially conforming throughout their area with the contour of the registering areas of the conveyer pans.

4. A magnetic pulley for pan conveyers and including a spool-shaped, magnetic core, an exciting winding on said core, and a protecting band inclosing said winding, said core having its poles extended radially beyond the periphery of said band.

5. A magnetic pulley for conveyers having magnetizable pans pivotally connected by fulcrum pins to adjacent pans, said pulley including a core having a pole shaped to conform to the bottoms of the pans throughout their lengths and provided with recesses adapted to receive said fulcrum pins.

6. A magnetic pulley for conveyers having magnetizable pans pivotally connected to adjacent pans by fulcrum pins having rollers, said pulley including a core having a pole shaped to conform to the bottoms of the pans throughout their lengths and provided with recesses adapted to receive said rollers whereby to support said pans.

7. A magnetic pulley for conveyers having magnetizable pans pivotally connected to adjacent pans by fulcrum pins having rollers, said pulley including a core having a pole shaped to conform to the bottom of the pans throughout their lengths and provided with recesses adapted to receive said rollers whereby to support said pans, said core being adapted as power transmitting means for actuating the conveyer.

8. A magnetic pulley for conveyers having magnetizable pans pivotally connected to adjacent pans and having rollers, said pulley including a core having a pole shaped to conform to the bottoms of the pans throughout their lengths and adapted to engage said rollers for support of said pans as they pass about said pulley.

9. A magnetic pulley for conveyers having magnetizable pans pivotally connected with adjacent pans having rollers, said pulley including a spool-shaped, magnetic core, having axially spaced magnetic flanges, and an exciting winding between said flanges, said flanges being shaped to conform to the bottoms of said pans and having recesses adapted to receive said rollers whereby to support said pans as they pass about said pulley.

10. A magnetic pulley for conveyers having magnetizable pans pivotally connected to adjacent pans, said pulley including a spool-shaped magnetic core having axially spaced magnetic flanges, and an exciting winding between said flanges, said flanges being extended radially beyond said exciting winding and shaped to conform to the bottoms of said pans.

11. A magnetic pulley for conveyers having magnetizable pans pivotally connected to adjacent pans by fulcrum pins extending across said pans, said pulley including a spool-shaped, magnetic core having axially spaced magnetic flanges, and an exciting winding between said flanges, said flanges being shaped to conform to the bottom of said pans and having recesses adapted to receive said fulcrum pins.

12. The combination with a belt conveyer comprising an endless series of pivotally connected magnetizable pans, of a magnetic pulley including a magnetic core and an exciting winding on said core, portions of said core being in close proximity to the pans as they pass about said pulley and shaped to conform to the bottoms of said pans throughout their registering areas.

13. The combination with a belt conveyer comprising an endless series of pivotally connected magnetizable pans, of a magnetic pulley including a spool-shaped, magnetic core and an exciting winding on said core, said core having its poles extended radially beyond the periphery of said winding and conforming to the bottoms of said pans as they pass about said pulley.

14. The combination with a belt conveyer comprising an endless series of pivotally connected magnetizable pans, of a magnetic pulley including a spool-shaped, magnetic core having axially spaced magnetic flanges, an exciting winding on said core disposed between said flanges, and a protecting band inclosing said winding, said flanges being extended beyond the protecting band into close proximity to the bottoms of said pans and shaped to conform to the said bottoms throughout their registering areas.

15. The combination with a belt conveyer comprising an endless series of magnetizable pans having fulcrum pins pivotally connecting adjacent pans, of a magnetic pulley including a spool-shaped, magnetic core having axially spaced magnetic flanges and an exciting winding on said flanges, and a protecting band inclosing said winding, said flanges being shaped to conform to the bottoms of said pans throughout their lengths and having recesses adapted to receive the fulcrum pins of said pans.

16. The combination with a belt conveyer comprising an endless series of magnetizable pans having fulcrum pins pivotally connecting adjacent pans, of a magnetic core and an exciting winding on said core, portions of said core being shaped to conform to the bottoms of the pans as they pass about said pulley and provided with recesse adapted to receive said fulcrum pins.

17. The combination with a belt conveyer comprising an endless series of magnetizable pans having fulcrum pins pivotally connecting adjacent pans and provided with rollers, of a magnetizable pulley including a magnetic core having a portion shaped to conform to the bottoms of said pans throughout their lengths and provided with recesses adapted to receive said fulcrum pins, and gear or sprocket wheels rotatable with said pulley and engageable with said rollers for supporting said pans as they pass about said pulley.

18. The combination with a belt conveyer comprising an endless series of magnetizable pans having fulcrum pins pivotally connecting adjacent pans and provided with rollers, of a shaft, a magnetic pulley secured to said shaft and having a magnetic core shaped to conform to the bottoms of said pans and provided with recesses adapted to receive said fulcrum pins, and gear or sprocket wheels secured to said shaft and engageable with said rollers.

JOHN P. BETHKE.